US012717426B2

(12) United States Patent
Dou

(10) Patent No.: US 12,717,426 B2
(45) Date of Patent: Aug. 25, 2026

(54) ENCODER AND MOUSE USING THE SAME

(71) Applicant: Silitek Electronics (Dongguan) Co., Ltd, Dongguan (CN)

(72) Inventor: Gang Dou, Dongguan (CN)

(73) Assignee: Silitek Electronics (Dongguan) Co., Ltd, Dongguan (CN)

( * ) Notice: Subject to any disclaimer, the term of this patent is extended or adjusted under 35 U.S.C. 154(b) by 0 days.

(21) Appl. No.: 18/195,086

(22) Filed: May 9, 2023

(65) Prior Publication Data

US 2023/0359288 A1 Nov. 9, 2023

(30) Foreign Application Priority Data

May 9, 2022 (CN) ........................ 202221104947.3

(51) Int. Cl.
*G06F 3/0354* (2013.01)

(52) U.S. Cl.
CPC ................................ *G06F 3/03543* (2013.01)

(58) Field of Classification Search
None
See application file for complete search history.

(56) References Cited

U.S. PATENT DOCUMENTS 4,598,965 A * 7/1986 Bricaud ................... H05K 7/12 439/329
5,393,247 A * 2/1995 DiOrazio ........... H01R 12/7064 411/510
5,828,364 A * 10/1998 Siddiqui ............... G06F 3/0312 345/163
6,100,480 A * 8/2000 Takahashi .............. H01H 25/00 200/11 R
6,507,334 B1 * 1/2003 Yamazaki ............. G06F 3/0362 345/156
10,963,069 B1 * 3/2021 Wu ..................... G06F 3/03543
2001/0043464 A1 * 11/2001 Takahashi .............. H05K 3/301 361/752
2002/0109968 A1 * 8/2002 Chen .................. G06F 3/03543 361/679.4
2003/0171015 A1 * 9/2003 Korsunsky ........... H05K 3/3485 439/108
2008/0192011 A1 * 8/2008 Yu ....................... G06F 3/03543 345/163
2017/0102788 A1 * 4/2017 Arceo .................. G06F 3/0362

* cited by examiner

*Primary Examiner* — Christopher R Lamb
(74) *Attorney, Agent, or Firm* — Innovation Counsel LLP

(57) ABSTRACT

An encoder and a mouse using the same are disclosed. The encoder includes a body, a first positioning portion and a second positioning portion. The first positioning portion is connected to the body and includes a first segment and a second segment, wherein the first segment extends outwardly relative to the body, and the second segment extends inwardly relative to the first segment. The second positioning portion is connected to the body and includes a third segment and a fourth segment, wherein the third segment extends outwardly relative to the body, and the fourth segment extends inwardly relative to the third segment.

13 Claims, 6 Drawing Sheets

ENCODER AND MOUSE USING THE SAME

This application claims the benefit of People's Republic of China application Serial No. 202221104947.3, filed on May 9, 2022, the subject matter of which is incorporated herein by reference.

BACKGROUND OF THE INVENTION

Field of the Invention

The invention relates in general to an encoder and a mouse using the same, and more particularly to an encoder having a positioning portion and a mouse using the same.

Description of the Related Art

A mouse includes an encoder and a scroll wheel, wherein the encoder could detect the information of the rotation of the scroll wheel. The encoder is inserted in a circuit board, and different structures of the encoder are designed in response to different thicknesses of the circuit board. However, the change in the design of the encoder means an extra mold is required, not only consuming more time but also incurring extra cost. Therefore, it has become a prominent task for the industries to provide a new encoder to resolve the generally known problems encountered in the prior art.

SUMMARY OF THE INVENTION

The present invention relates to an encoder and a mouse using the same capable of resolving existing problems disclosed above.

According to one embodiment of the present invention, an encoder adapted to a mouse is provided. The encoder includes a body, a first positioning portion and a second positioning portion. The first positioning portion is connected to the body and includes a first segment and a second segment, wherein the first segment extends outwardly relative to the body; the second segment extends inwardly relative to the first segment. The second positioning portion is connected to the body and includes a third segment and a fourth segment, wherein the third segment extends outwardly relative to the body; the fourth segment extends inwardly relative to the third segment.

In the encoder, the first positioning portion further includes a connecting segment, wherein the connecting segment connects the body and the first segment of the first positioning portion; the first segment extends outwardly relative to the connecting segment; the angle included between the first segment and the connecting segment ranges from 95° to 180°.

In the encoder, the second segment includes a first sub-segment and a second sub-segment, wherein the second sub-segment connects the first sub-segment and the first segment; the first sub-segment extends inwardly relative to the second sub-segment.

In the encoder, the first positioning portion further includes a connecting segment, wherein the connecting segment connects the body and the first segment of the first positioning portion, and is substantially parallel to the second segment.

In the encoder, the second segment includes a first sub-segment and a second sub-segment, wherein the second sub-segment connects the first sub-segment and the first segment, and is substantially parallel to the connecting segment.

In the encoder, the first positioning portion further includes a connecting segment, wherein the connecting segment connects the body and the first segment of the first positioning portion; the first segment and the second segment are connected at a junction; the connecting segment has a limiting structure; the distance between the limiting structure and the junction is less than the distance between the junction and an end of the second segment.

According to another embodiment of the present invention, an encoder adapted to a circuit board is provided. The circuit board has a first through hole and a second through hole, wherein the first through hole and the second through hole are separated by a first maximum interval. The encoder includes a body, a first positioning portion and a second positioning portion. The first positioning portion and the second positioning portion are connected to the body. The first positioning portion and the second positioning portion are separated by a second maximum interval, which is greater than or equivalent to the first maximum interval.

In the encoder, the first positioning portion includes a first segment and a second segment, respectively extending in different directions; the second positioning portion includes a third segment and a fourth segment, respectively extending in different directions.

In the encoder, the first positioning portion further includes a connecting segment, wherein the connecting segment connects the body and the first segment of the first positioning portion; the first segment extends outwardly relative to the connecting segment; the angle included between the first segment and the connecting segment ranges from 95° to 180°; at least a part of the second segment is substantially parallel to the connecting segment.

In the encoder, the second segment includes a first sub-segment and a second sub-segment, wherein the second sub-segment connects the first sub-segment and the first segment; the first sub-segment and the second sub-segment respectively extend in different directions.

In the encoder, the fourth segment includes a third sub-segment and a fourth sub-segment, wherein the fourth sub-segment connects the third sub-segment and the third segment; the third sub-segment and the fourth sub-segment respectively extend in different directions; the second maximum interval is the distance between the second sub-segment and the fourth sub-segment.

In the encoder, the first segment and the second segment are connected at a first junction; the third segment and the fourth segment are connected at a second junction; the second maximum interval is defined by the distance between the first junction and the second junction.

In the encoder, the first positioning portion further includes a connecting segment, wherein the connecting segment has a limiting structure connected to the first segment; the first segment and the second segment are connected at a junction; the thickness of the circuit board is equivalent to or less than the distance between the limiting structure and the junction.

According to an alternate embodiment of the present invention, a mouse is provided. The mouse includes a circuit board and one of the abovementioned encoders. The encoder is disposed on and electrically connected to the circuit board.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the present invention are disclosed below with accompanying drawings and exemplary embodiments. The descriptions, accompanying drawings and exemplary embodiments disclosed below are not for limiting the scope of protection of the present invention.

Figure 1:
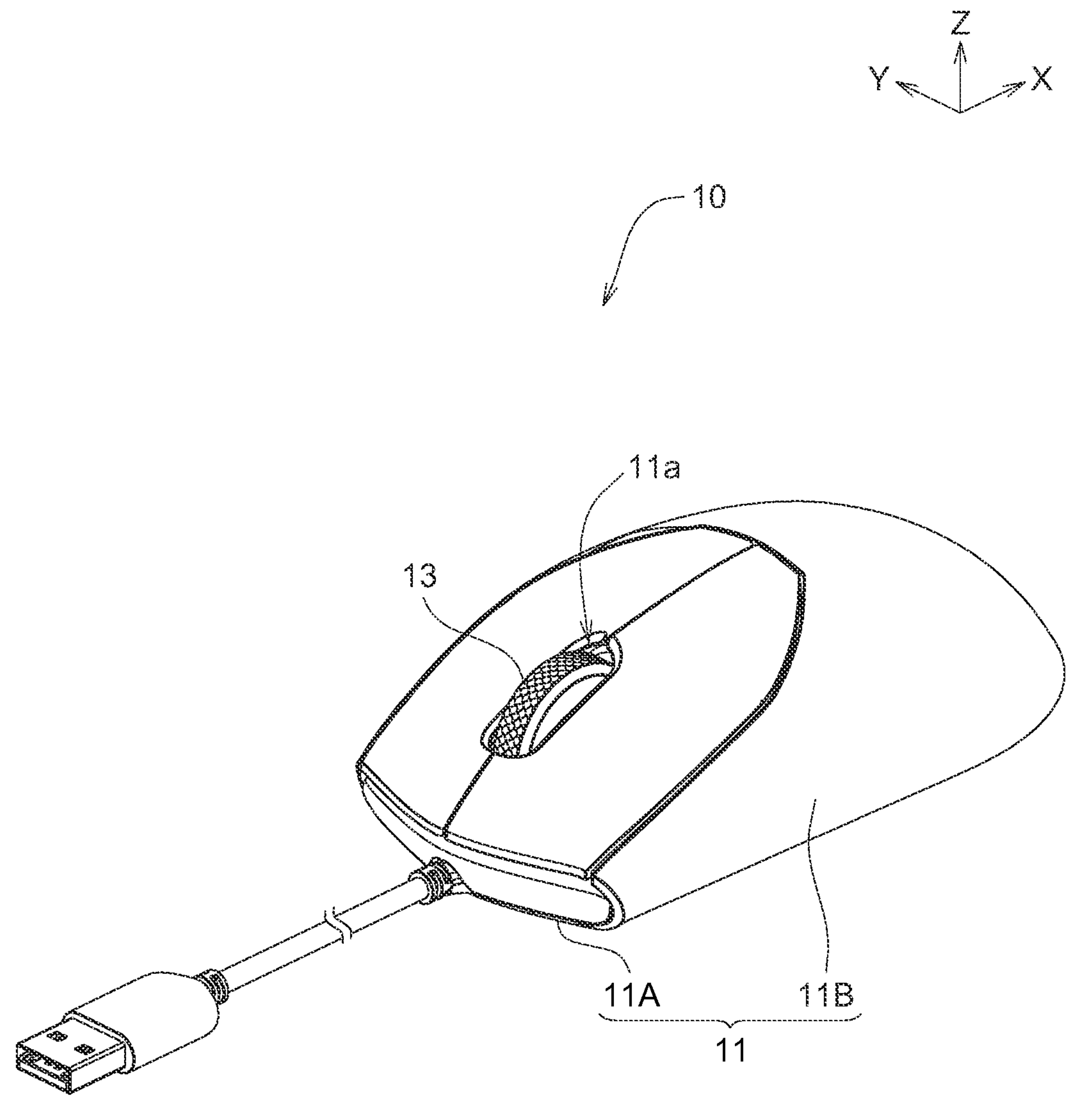
FIG. 1 is a schematic diagram of a mouse an embodiment of the present invention.
Figure 2:
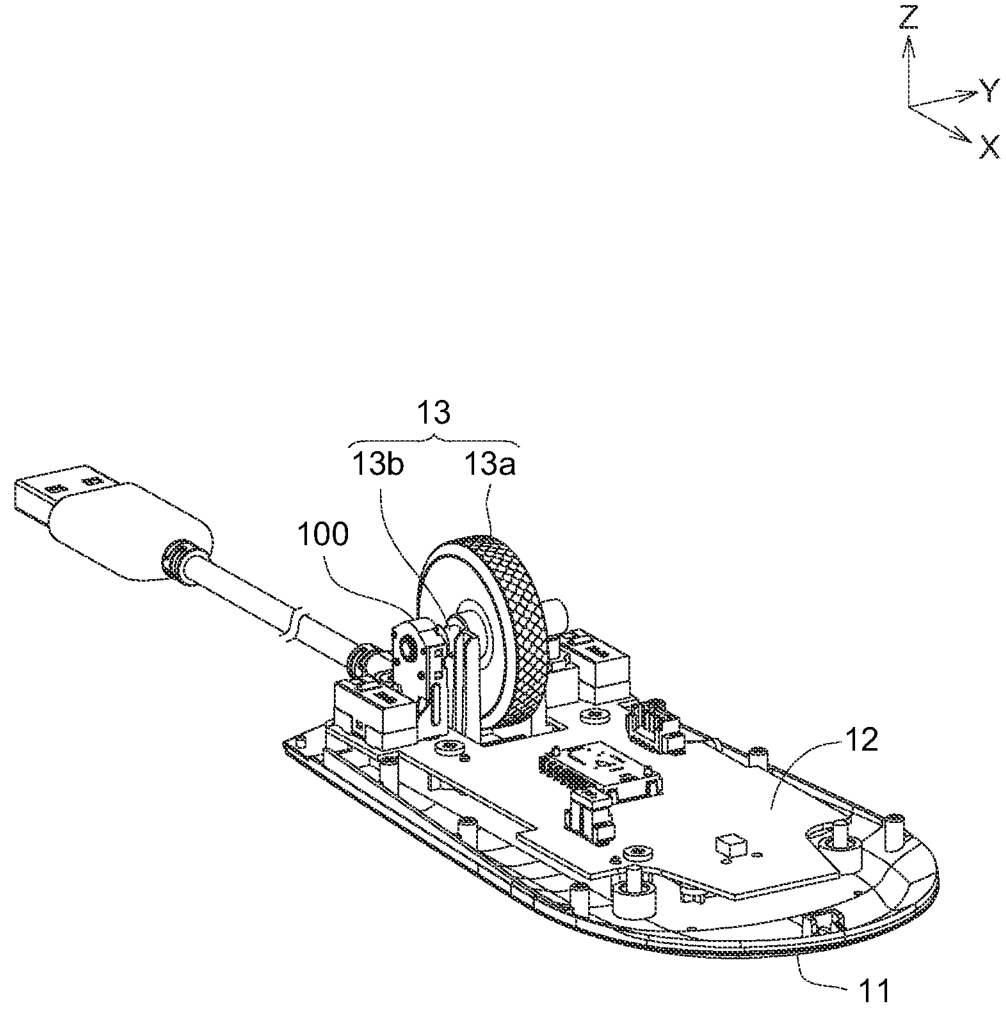
FIG. 2 is a schematic diagram of the interior of the mouse of FIG. 1 (the upper casing is not illustrated).
Figure 3:
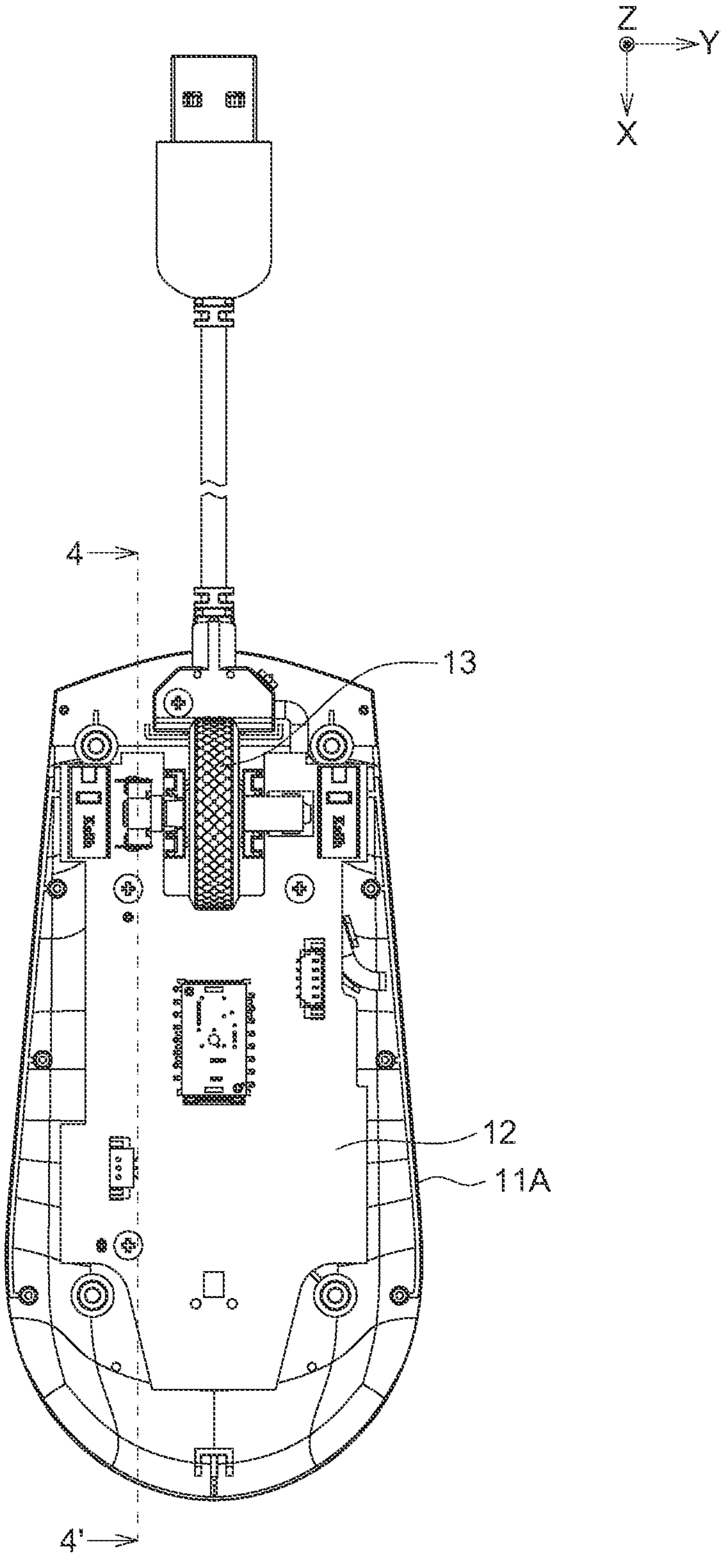
FIG. 3 is a top view of the mouse of FIG. 2.
Figure 4:
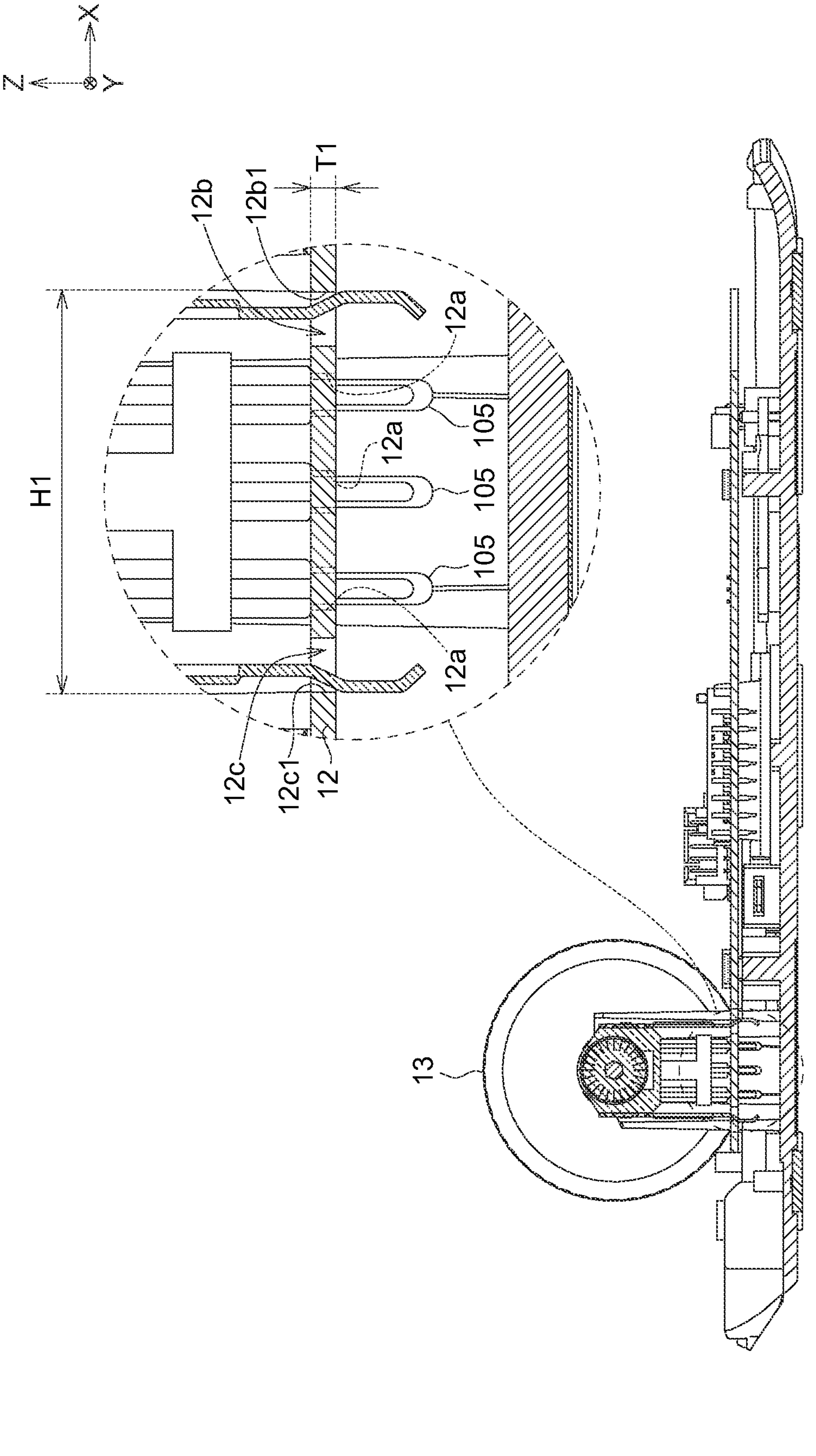
FIG. 4 is a cross-segmental view of the mouse of FIG. 3 along direction 4-4'.
Figure 5:
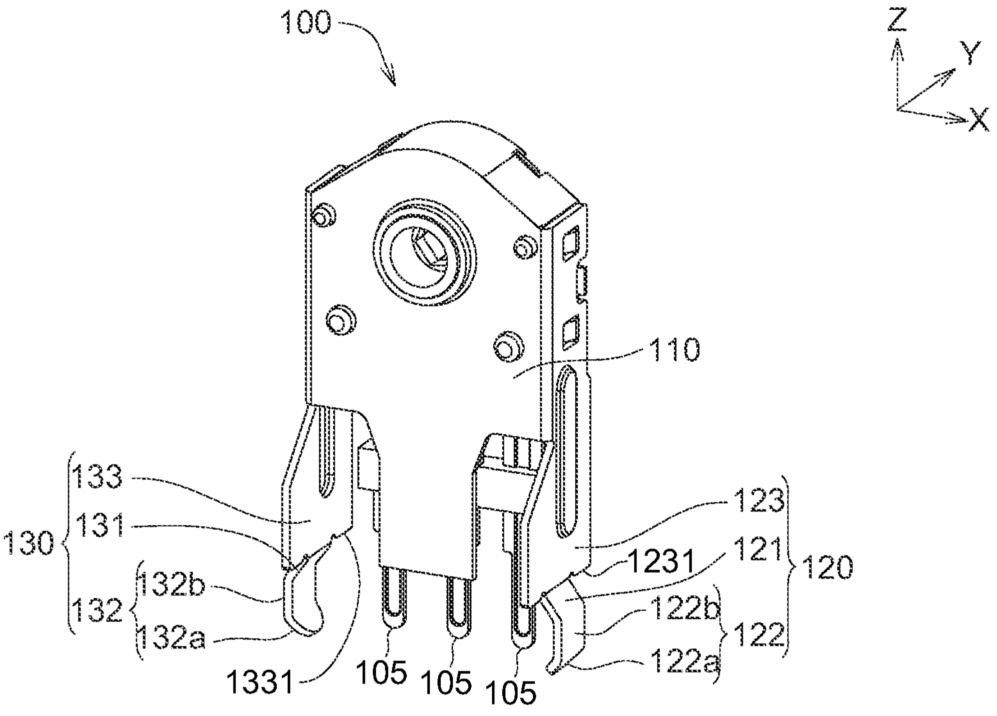
FIGS. 5 to 6 are schematic diagrams of the encoder of FIG. 4.
Figure 6:
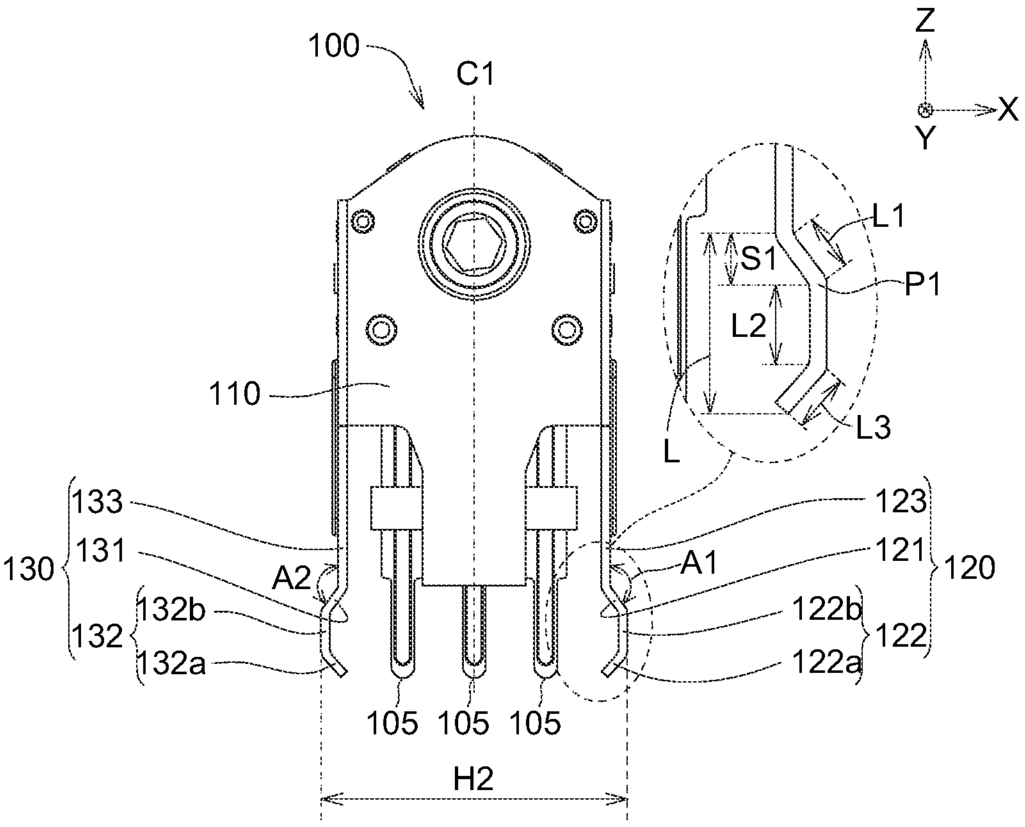

Refer to FIGS. 1 to 6. FIG. 1 is a schematic diagram of a mouse 10 an embodiment of the present invention. FIG. 2 is a schematic diagram of the interior of the mouse 10 of FIG. 1 (the upper casing is not illustrated). FIG. 3 is a top view of the mouse 10 of FIG. 2. FIG. 4 is a cross-segmental view of the mouse 10 of FIG. 3 along direction 4-4'. FIGS. 5 to 6 are schematic diagrams of the encoder 100 of FIG. 4.

As indicated in FIGS. 1 to 3, the mouse 10 includes a casing 11, a circuit board 12, a scroll wheel 13 and an encoder 100. The encoder 100 is disposed on and electrically connected to the circuit board 12, and connects the scroll wheel 13. The encoder 100 could detect the direction (clockwise or anticlockwise), amount and speed of the rotation of the scroll wheel 13.

As indicated in FIGS. 1 to 3, the casing 11 includes a bottom casing 11A and an upper casing 11B. The circuit board 12 is disposed on the bottom casing 11A. The upper casing 11B is bonded to the bottom casing 11A, and covers the circuit board 12, a part of the scroll wheel 13 and the encoder 100 to protect these elements. The upper casing 11B has a through hole 11*a* from which a part of the scroll wheel 13 is protruded for the convenience of operation. The scroll wheel 13 includes a wheel body 13*a* and an axle 13*b*, wherein the axle 13*b* is fixed at the center of the wheel body 13*a* and is laterally protruded relative to the wheel body 13*a*. The axle 13*b* passes through the encoder 100, and could rotate with the wheel body 13*a*.

As indicated in FIGS. 4 to 6, the encoder 100 includes several signal pins 105, a body 110, a first positioning portion 120, and a second positioning portion 130. The first positioning portion 120 and the second positioning portion 130 respectively are connected to two opposite sides of the body 110. The first positioning portion 120 is connected to the body 110, and includes a first segment 121 and a second segment 122, respectively extending in different directions. For instance, the first segment 121 extends outwardly relative to the body 110, and the second segment 122 extends inwardly relative to the first segment 121. The second positioning portion 130 is connected to the body 110, and includes a third segment 131 and a fourth segment 132, respectively extending in different directions. For instance, the third segment 131 extends outwardly relative to the body 110, and the fourth segment 132 extends inwardly relative to the third segment 131. Due to the structure of the positioning portions, the two positioning portions could provide an elasticity and could be separated by a suitable distance, and therefore could be interfered with and inserted into the two through holes of the circuit board to fix relative positions between the encoder 100 and the circuit board 12. Besides, the phrase "extending outwardly" means extending in a direction away from the central line C1 of the body 110; the phrase "extending inwardly" means extending in a direction towards the central line C1 of the body 110.

As indicated in FIGS. 4 to 6, the circuit board 12 includes several through holes 12*a* and a circuit layer (not illustrated). Each signal pin 105 could be inserted into a corresponding through hole 12*a*, and is electrically connected to the circuit layer (for instance, through soldering). The detection signal indicating the rotation of the axle 13*b* is detected by the encoder 100 and then is transmitted to a processor (not illustrated) through the signal pins 105 and the circuit layer. The processor is disposed on the circuit board 12 and is configured to analyze the detection signal of the encoder 100 to obtain the direction, amount and speed of the rotation of the wheel body 13*a*.

As indicated in FIG. 4, the circuit board 12 has a first through hole 12*b* and a second through hole 12*c*, which are separated by a first maximum interval H1 (along the X-axis). As indicated in FIG. 6, the first positioning portion 120 and the second positioning portion 130 are separated by a second maximum interval H2 (along the X-axis), which is greater than or equivalent to the first maximum interval H1. Thus, when the first positioning portion 120 of the encoder 100 and the second positioning portion 130 respectively are inserted into the first through hole 12*b* and the second through hole 12*c* of the circuit board 12, the first positioning portion 120 and the second positioning portion 130 are deformed and therefore apply an elastic resilience on the sidewall 12*b*1 of the first through hole 12*b* and the sidewall 12*c*1 of the second through hole 12*c* to stabilize and fix relative positions between the circuit board 12 and the encoder 100.

As indicated in FIGS. 5 and 6, the first positioning portion 120 further includes a connecting segment 123, which connects the body 110 and the first segment 121 of the first positioning portion 120. The first segment 121 extends outwardly relative to the connecting segment 123. The angle A1 included between the first segment 121 and the connecting segment 123 (the included angle on the outer side) ranges between 95° and 180° but excludes 180°. In comparison to an acute angle, the included angle A1 is an obtuse angle and therefore could increase the distance between the second segment 122 of the first positioning portion 120 (the second segment 122 is connected to the first segment 121) and the second positioning portion 130 to match the distance between the first through hole 12*b* and the second through hole 12*c* of the circuit board 12. Likewise, the second positioning portion 130 further includes a connecting segment 133, which connects the body 110 and the third segment 131 of the second positioning portion 130. The third segment 131 extends outwardly relative to the connecting segment 133. The angle A2 included between the third segment 131 and the connecting segment 133 (the included angle is on the outer side) ranges between 95° and 180° but excludes 180°. In comparison to an acute angle, the included angle A2 is an obtuse angle and therefore could increase the distance between the fourth segment 132 of the second positioning portion 130 (the fourth segment 132 is connected to the third segment 131) and the first positioning portion 120 to match the distance between the first through hole 12*b* and the second through hole 12*c* on the circuit board 12. Besides, the connecting segment 123 and the connecting segment 133 respectively have limiting structures 1231 and 1331, which could lean on the circuit board 12 to assure relative positions between the encoder 100 and the circuit board 12*a* long the Z-axis. The Z-axis could be the extending direction of the first positioning portion 120 and the second positioning portion 130, such as the extending direction of the connecting segment 123 and the connecting segment 133. Moreover, the limiting structure 1231, such as the bottom side of the connecting segment 123, is substantially parallel to the XY plane, which is perpendicular to the Z-axis. Likewise, the limiting structure 1331, such as the bottom side of the connecting segment 133, is substantially parallel to the XY plane. In an embodiment, the limiting structure 1231 and the limiting structure 1331 could be co-planar. Depending on the structure of the circuit board 12, a segment difference could be formed between the limiting structures 1231 and 1331 along the Z-axis.

As indicated in FIGS. 4 to 6, at least a part of the second segment 122 of the first positioning portion 120 is substantially parallel to the connecting segment 123. For instance, the second segment 122 includes a first sub-segment **122*a* and a second sub-segment 122*b*, which connects the first sub-segment 122*a* and the first segment 121. The first sub-segment 122*a* and the second sub-segment 122*b* respectively extend in different directions. For instance, the first sub-segment 122*a* extends inwardly relative to the second sub-segment 122*b*. In an embodiment, the second sub-segment 122*b* is substantially parallel to the connecting segment 123. When the first positioning portion 120 of the encoder 100 is inserted into the first through hole 12*b* of the circuit board 12, depending on the thickness T1 of the circuit board 12, the first segment 121 or the second sub-segment 122*b* could lean on the sidewall 12*b*1 of the first through hole 12*b*. Likewise, the fourth segment 132 of the second positioning portion 130 is substantially parallel to the connecting segment 133. The fourth segment 132 includes a third sub-segment 132*a* and a fourth sub-segment 132*b*, which connects the third sub-segment 132*a* and the third segment 131. The third sub-segment 132*a* and the fourth sub-segment 132*b* respectively extend in different directions. For instance, the third sub-segment 132*a* extends inwardly relative to the fourth sub-segment 132*b*. In an embodiment, the fourth sub-segment 132*b* is substantially parallel to the connecting segment 133. When the second positioning portion 130 of the encoder 100 is inserted into the second through hole 12*c* of the circuit board 12, depending on the thickness T1 of the circuit board 12, the third segment 131 or the fourth sub-segment 132*b* could lean on the sidewall 12*c*1 of the second through hole 12*c*. In another embodiment, the second sub-segment 122*b* could be an arced segment connected between the first segment 121 and the first sub-segment 122*a*; the fourth sub-segment 132*b* could also be an arced segment connected between the third segment 131 and the third sub-segment 132*a*. Moreover, the second maximum interval H2 could be defined by the distance between the second sub-segment 122*b* and the fourth sub-segment 132*b***.

The included angle A1 depends on the position of the second sub-segment **122*b*. For instance, the larger the distance between the second sub-segment 122*b* and the second positioning portion 130, the smaller the included angle A1; conversely, the smaller the distance between the second sub-segment 122*b* and the second positioning portion 130, the larger the included angle A1. Likewise, the included angle A2 also depends on the position the fourth sub-segment 132*b*. For instance, the smaller the distance between the fourth sub-segment 132*b* and the first positioning portion 120, the larger the included angle A2; conversely, the larger the distance between the fourth sub-segment 132*b* and the first positioning portion 120, the smaller the included angle A2**.

In an embodiment, the structure of the first positioning portion 120 and the structure of the second positioning portion 130 could be symmetric with respect to the central line C1 of the body 110, but the embodiments of the present invention are not limited thereto.

Depending on the thickness T1 of the circuit board 12, when the encoder 100 is inserted into the circuit board 12, the sidewall **12*b*1 of the first through hole 12*b* of the circuit board 12 could lean on distinct parts of the first positioning portion 120. As indicated in FIGS. 4 to 6, when the thickness T1 of the circuit board 12 is equivalent to or less than the distance S1 between the limiting structure 1231 and the junction P1 of the first segment 121 and the second segment 122 (along the Z-axis), the first segment 121 of the first positioning portion 120 leans on the sidewall 12*b*1 of the first through hole 12*b* of the circuit board 12. Even when the thickness T1 of the circuit board 12 is less than the distance S1, the first positioning portion 120 still could apply an elastic resilience on the sidewall 12*b*1 of the first through hole 12*b*. When the thickness T1 of the circuit board 12 is greater than the distance S1, the second sub-segment 122*b* of the first positioning portion 120 leans on the sidewall 12*b*1 of the first through hole 12*b* of the circuit board 12**.

As indicated in FIGS. 5 to 6, the thickness T1 of the circuit board 12 could be equivalent to or less than the distance S1 between the limiting structure 1231 and the junction P1 of the first segment 121 and the second segment 122, could range between the distance S1 and the sum of the distance S1 and the length L2 of the second sub-segment **122*b*, or could be equivalent to or greater than the sum of the distance S1 and the length L2. In another embodiment, the thickness T1 of the circuit board 12 could be less than the sum of the distance S1 and the length L2 of the second sub-segment 122*b*. In an embodiment, the length L2 of the second sub-segment 122*b* could be equivalent to or greater than a ratio (such as ⅓) of the length L of the first positioning portion 120 (for instance, along the Z-axis), but the embodiments of the present invention are not limited thereto. The length L of the first positioning portion 120 is the distance from the limiting structure 1231 to the terminal end of the first sub-segment 122*a*. The structure and/or size and characteristics of the second positioning portion 130 are similar or identical to that of the first positioning portion 120**, and are not repeated here.

With suitable design of the first positioning portion 120, such as the design of the length L2 of the second sub-segment **122*b*, the encoder 100 could be adapted to different thicknesses of the circuit board 12, hence avoiding the need of a new mold which would otherwise incur extra labor hours and costs. For instance, the encoder 100 could be adapted to the circuit board 12 of which the thickness T1 ranges between 0.8 millimeters and 1.6 millimeters or a circuit board even thinner or even thicker than the circuit board 12**.

In an embodiment, when the thickness T1 of the circuit board 12 is smaller (such as 0.8 millimeters), the sidewall **12*b*1 of the first through hole 12*b* of the circuit board 12 could lean on the first segment 121. Since the thickness T1 of the circuit board 12 is smaller, the contact between the sidewall 12*b*1 of the first through hole 12*b* of the circuit board 12 and the first segment 121 could be point contact only. The first positioning portion 120 applies an elastic resilience on the sidewall 12*b*1 of the first through hole 12*b* to stabilize and fix relative positions between the circuit board 12 and the encoder 100**.

In another embodiment, when the thickness T1 of the circuit board 12 is larger (such as 1.6 millimeters), the sidewall **12*b*1 of the first through hole 12*b* of the circuit board 12 could lean on the second sub-segment 122*b*. As indicated in FIGS. 4 and 6, since the second sub-segment 122*b* (in a free state) is substantially parallel to the sidewall 12*b*1 of the first through hole 12*b*, the contact between the second sub-segment 122*b* and the sidewall 12*b*1 of the first through hole 12*b* could be planar contact or linear contact. As the thickness T1 of the circuit board 12 increases, the contact area or contact length will also increase, making the circuit board 12 and the encoder 100** more stably bonded.

The contact between the sidewall **12*c*1 of the second through hole 12*c* and the second positioning portion 130 is similar to that between the sidewall 12*b*1 of the first through hole 12*b* and the first positioning portion 120**, and is not repeated here.

Figure 7:
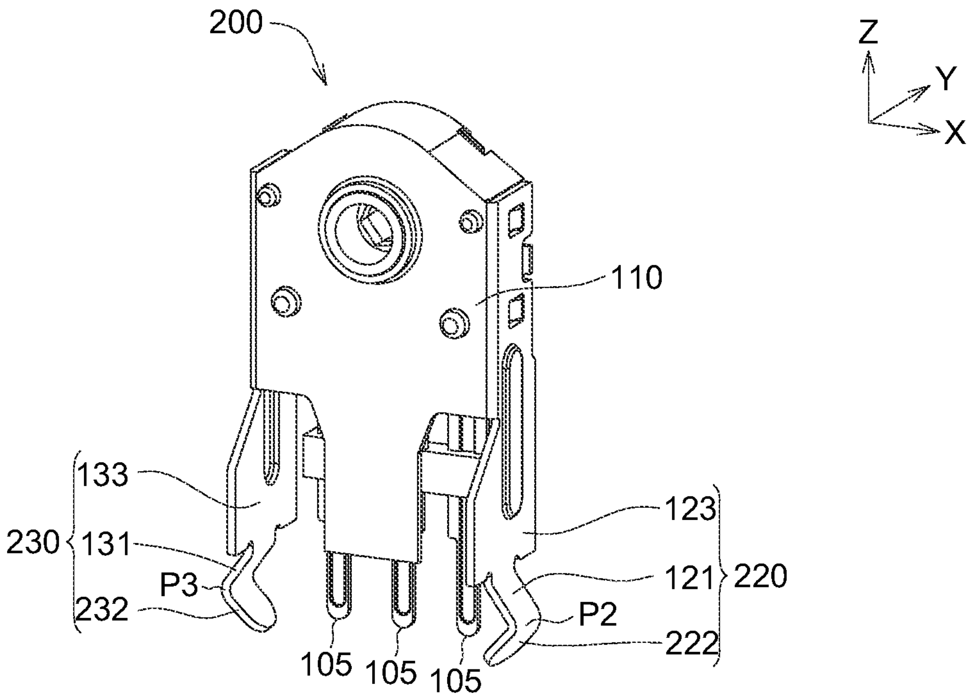
FIGS. 7 to 8 are schematic diagrams of an encoder according to another embodiment of the present invention.
Figure 8:
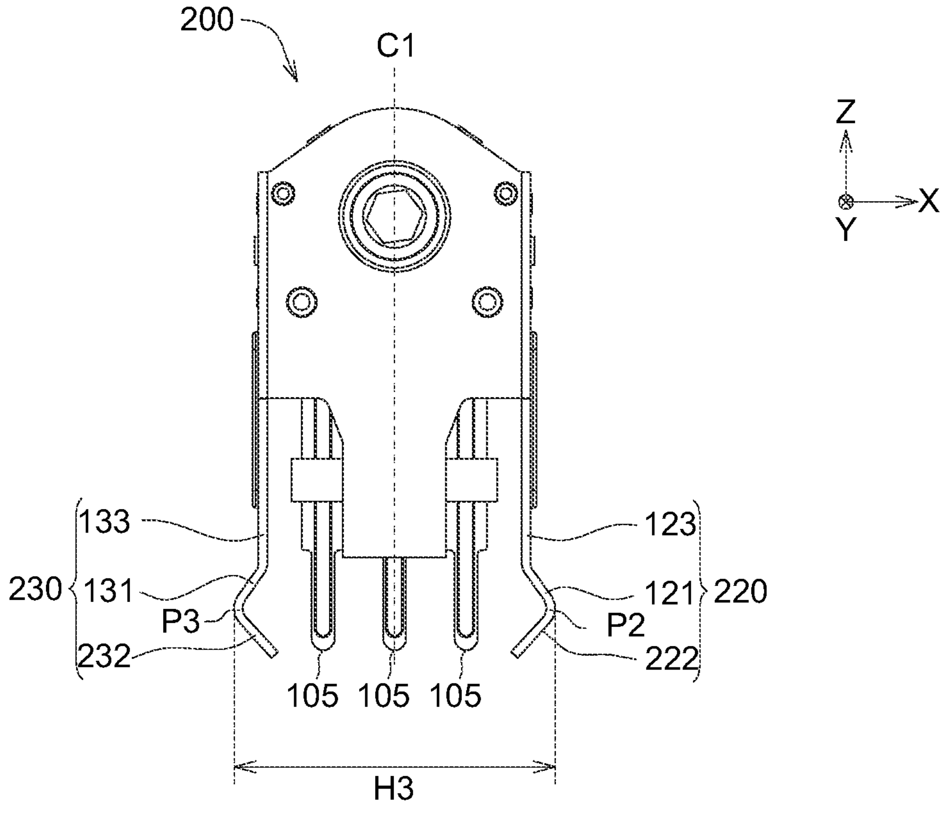

Referring to FIGS. 7 to 8, schematic diagrams of an encoder 200 according to another embodiment of the present invention are shown. The encoder 200 includes several signal pins 105, a body 110, a first positioning portion 220 and a second positioning portion 230. The first positioning portion 220 is connected to the body 110, and includes a first segment 121 and a second segment 222. The first segment 121 extends outwardly relative to the body 110. The second segment 222 extends inwardly relative to the first segment 121. The second positioning portion 230 is connected to the body 110, and includes a third segment 131 and a fourth segment 232. The third segment 131 extends outwardly relative to the body 110. The fourth segment 232 extends inwardly relative to the third segment 131. The encoder 200 could be stably inserted into the circuit board 12 through the first positioning portion 220 and the second positioning portion 230.

In comparison to the encoder 100 of the previous embodiment, the second sub-segment **122*b* of the second segment 222 and the fourth sub-segment 132*b* of the fourth segment 232 are omitted in the encoder 200 of the present embodiment. In the present embodiment, the structure of the second segment 222 is similar or identical to that the first sub-segment 122*a*; the structure of the fourth segment 232 is similar or identical to that of the third sub-segment 132*a*. Remaining structures of the encoder 200 are similar or identical to corresponding structures of the encoder 100**, and are not repeated here.

As indicated in FIGS. 7 to 8, the first positioning portion 220 and the second positioning portion 230 are separated by a second maximum interval H3 (along the X-axis), which is greater than or equivalent to the first maximum interval H1 (the first maximum interval H1 is illustrated in FIG. 4). Besides, the first segment 121 and the second segment 222 are connected at the first junction P2; the third segment 131 and the fourth segment 232 are connected at the second junction P3. The second maximum interval H3 of the present embodiment is defined by, for example, the distance between the first junction P2 and the second junction P3. In an embodiment, the first junction P2 and the second junction P3 respectively could have arced surfaces. For instance, the first junction P2 and the second junction P3 could lean on the sidewall **12*b*1 of the first through hole 12*b* and the sidewall 12*c*1 of the second through hole 12*c* by non-point contacts (refer to FIG. 4). Therefore, despite the encoder 200 dispenses with the second sub-segment 122*b* and the fourth sub-segment 132*b* of the encoder 100, the encoder 200** still could be adapted to different thicknesses of the circuit board.

To summarize, the present disclosure disclose an encoder, which includes a body and two positioning portions connected to the body. Each positioning portion includes two interconnected segments. In any of the two positioning portions, one segment extends towards one direction relative to the body, and the other segment extends towards another direction relative to the body. Thus, the two positioning portions could provide an elasticity and could be separated by a suitable distance, and therefore could be interfered with and inserted into the two through holes of the circuit board.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. An encoder adapted for engagement with a circuit board having a first through hole and a second through hole with a first maximum interval between the first through hole and the second through hole, the encoder comprising:

a body;

a first positioning portion connected to the body and comprising a first segment and a second segment connected with the first segment; and a second positioning portion connected to the body and comprising a third segment and a fourth segment connected with the third segment;

wherein the first positioning portion and the second positioning portion are separated by a second maximum interval greater than or equivalent to the first maximum interval;

wherein the second segment comprises a first sub-segment and a second sub-segment connecting the first sub-segment to the first segment;

wherein the fourth segment comprises a third sub-segment and a fourth sub-segment connecting the third sub-segment to the third segment;

wherein the second sub-segment and the fourth sub-segment are separated by a constant distance;

wherein the first sub-segment extends inwardly from the second sub-segment to form a terminal of the second segment, and the third sub-segment extends inwardly from the fourth sub-segment to form a terminal of the fourth segment.

2. The encoder according to claim 1, wherein the second segment and the first segment respectively extend in different directions, and the third segment and the fourth segment respectively extend in different directions.

3. The encoder according to claim 2, wherein the first segment is connected with a connecting segment of the first positioning portion and extends outwardly relative to the connecting segment, the angle included between the first segment and the connecting segment is between 95° and 180°, and at least a part of the second segment is substantially parallel to the connecting segment.

4. The encoder according to claim 2, wherein the second sub-segment connects the first sub-segment with the first segment, and the first sub-segment and the second sub-segment respectively extend in different directions.

5. The encoder according to claim 4, wherein the fourth sub-segment connects the third sub-segment with the third segment, the third sub-segment and the fourth sub-segment respectively extend in different directions, and the second maximum interval is defined by a distance between the second sub-segment and the fourth sub-segment.

6. The encoder according to claim 2, wherein a connecting segment of the first positioning portion has a limiting structure connected to the first segment, the first segment and the second segment are connected at a junction, and a thickness of the circuit board is equivalent to or less than a distance between the limiting structure and the junction.

7. A mouse, comprising:

a circuit board;

a scroll wheel; and an encoder and electrically connected to the circuit board, connected to the scroll wheel and comprising:

a body:

a first positioning portion, being connected to the body and comprising a first segment and a second segment, wherein the second segment extends inwardly relative to the first segment; and a second positioning portion, being connected to the body and comprising a third segment and a fourth segment, wherein the third segment extends outwardly from the body, and the fourth segment extends inwardly relative to the third segment;

wherein the second segment comprises a first sub-segment and a second sub-segment connecting the first sub-segment to the first segment;

wherein the fourth segment comprises a third sub-segment and a fourth sub-segment connecting the third sub-segment to the third segment;

wherein the second sub-segment and the fourth sub-segment are separated by a constant distance;

wherein the first sub-segment and the second sub-segment of the second segment protrude relative to a lower surface of the circuit board, and the third sub-segment and the fourth sub-segment of the fourth segment protrude relative to the lower surface of the circuit board.

8. The mouse according to claim 7, wherein the first segment is connected with a connecting segment of the first positioning portion and extends outwardly relative to the connecting segment, and an angle included between the first segment and the connecting segment ranges between 95° and 180°.

9. The mouse according to claim 7, wherein the second sub-segment connects the first sub-segment with the first segment, and the first sub-segment extends inwardly relative to the second sub-segment.

10. The mouse according to claim 7, wherein a connecting segment of the first positioning portion is substantially parallel to the second segment.

11. The mouse according to claim 10, wherein the second sub-segment connects the first sub-segment with the first segment, and the second sub-segment is substantially parallel to the connecting segment.

12. The mouse according to claim 7, wherein the first segment and the second segment are connected at a junction, a connecting segment of the first positioning portion has a limiting structure, and a thickness of the circuit board is equivalent to or less than a distance between the limiting structure and the junction.

13. The mouse according to claim 7, wherein the circuit board has a first through hole and a second through hole with a first maximum interval therebetween, and the first positioning portion and the second positioning portion are separated by a second maximum interval greater than or equivalent to the first maximum interval.

* * * * *